(12) United States Patent
McDonald

(10) Patent No.: US 6,335,753 B1
(45) Date of Patent: Jan. 1, 2002

(54) WIRELESS COMMUNICATION VIDEO TELEPHONE

(76) Inventor: Arcaster McDonald, 166-05 Highland Ave., apt. 8C, Jamaica, NY (US) 11432

(*) Notice: Subject to any disclaimer, the term of this patent is extended or adjusted under 35 U.S.C. 154(b) by 0 days.

(21) Appl. No.: 09/097,524

(22) Filed: Jun. 15, 1998

(51) Int. Cl.[7] ................................................. H04N 7/14
(52) U.S. Cl. ......................................................... 348/14
(58) Field of Search .................... 348/12–20; 379/93.09, 379/93.17, 93.21, 93.23, 100.16; 455/12.1, 13.1, 13.3, 432, 573

(56) References Cited

U.S. PATENT DOCUMENTS

| | | | |
|---|---|---|---|
| 4,715,059 A | | 12/1987 | Cooper-Hart et al ......... 348/18 |
| 4,932,047 A | | 6/1990 | Emmons et al. .............. 348/14 |
| 4,985,911 A | | 1/1991 | Emmons et al. .............. 348/17 |
| 5,191,601 A | | 3/1993 | Ida et al. ...................... 348/14 |
| 5,418,560 A | * | 5/1995 | Yasuda .................... 379/93.23 |
| 5,491,507 A | * | 2/1996 | Umezawa et al. ............ 348/14 |
| 5,528,285 A | * | 6/1996 | Morikawa et al. ............ 348/14 |
| 5,550,754 A | * | 8/1996 | McNelley et al. ............ 348/13 |
| 5,760,824 A | * | 6/1998 | Hicks, III ..................... 348/14 |
| 5,793,416 A | * | 8/1998 | Rostoker et al. .............. 348/17 |
| 5,963,245 A | * | 10/1999 | McDonald ................... 348/14 |

* cited by examiner

Primary Examiner—Duc Nguyen
Assistant Examiner—George Eng

(74) Attorney, Agent, or Firm—Michael I. Kroll

(57) ABSTRACT

A wireless communication video telephone system for establishing a wireless audio/video communication between first and second video telephone units. The system includes first and second video telephone units and respective first and second wireless communication devices for establishing a wireless communication channel therebetween. Each video telephone units includes a receiver connected to the respective wireless communication device and a display screen for displaying the received video image. A microprocessor is connected to both the receiver and the display unit for receiving the audio and video data signals transmitted over the wireless communication channel. A data storage device is connected to the microprocessor for storing data representative of an image and a digital camera for capturing a digital image and transmitting said captured digital image to the microprocessor. The video telephone is operable in a first-in-use mode in which the microprocessor reads data from data storage device and displays an image represented by the read data on the display unit and a second in-use mode in which the microprocessor receives the digital data representative of the captured image from the digital camera and the video signal received over the wireless communications channel for display of both on the display unit simultaneously. Each video telephone unit may include a handset for remote wireless operation. The wireless communication device may be one of a satellite dish, a cellular communication unit or any other known device for establishing a wireless communications channel.

11 Claims, 7 Drawing Sheets

WIRELESS COMMUNICATION VIDEO TELEPHONE

BACKGROUND OF THE INVENTION

1. Field of the Invention

The present invention relates generally to communication devices and, more specifically, to a wireless communication video telephone retained on a wall and including remote control capabilities able to transmit both audio and video signals via satellite and/or cellular communication channels.

2. Description of the Prior Art

Numerous audio and video communication devices have been provided in the prior art. For example, U.S. Pat. No. 4,715,059; 4,932,047; 4,985,911; and 5,191,601 all are illustrative of such prior art. While these units may be suitable for the particular purpose to which they address, they would not be as suitable for the purposes of the present invention as heretofore described.

U.S. Pat. No. 4,715,059

Inventor: Michael A. Cooper Hart et al.

Issued: Dec. 22, 1987

The present invention is a conversational freeze-frame video phone which transmits a source image over a standard telephone line in conjunction with audio voice signals. A camera is used to capture an image to be transmitted and the image is mapped onto an image field of 2,000 to 5,000 pixels. The image field is displayed on a display area of approximately one square inch on a display screen. Digitized data representing the pixels is asynchronously transmitted on a modulated signal in a single burst of less than three seconds duration. Corresponding remote images are asynchronously received, demodulated, and displayed. The transmission of the audio signals is interrupted upon the detection of a video image being transmitted.

U.S. Pat. No. 4,932,047

Inventor: Lawrence D. Emmons et al.

Issued: Jun. 5, 1990

An improved video phone transmits a source image over a standard telephone line in conjunction with voice signals. The unique initialization protocol provides a hardware preamble for synchronizing a receiver clock, a software preamble for identifying the video image and disabling the audio, automatic gain control adjustment data and amplitude calibration data. The audio portion is disabled by coupling a capacitor across the telephone to effectively short the telephone. The telephone is placed across a bridge circuit which is provided with switches to balance the bridge in both the telephone and video modes. The transmitted and received signals pass through the same delay equalization circuit, so that half the equalization is done before transmission, with the remaining half being done after reception. Input and output selectors allow the same circuit to be used. The digital signals are level shifted up prior to being converted into analog, and then are shifted down again to reduce the effects of DC offset. The digital and analog voltage supplies are coupled together with a resistor and diode, and a capacitor is coupled between the analog supply and ground to combine the reset and voltage supply functions. An RC circuit providing 180 degrees of phase shift is coupled to the crystal oscillator to produce a clock which is locked into the series resonant frequency of the oscillator. The camera and the rest of the circuitry are turned on and off by a switch coupled to panel which can be slid in front of the camera.

U.S. Pat. No. 4,985,911

Inventor: Lawrence D. Emmons et al.

Issued: Jan. 15, 1991

An improved video phone which transmits a source image over a standard telephone line in conjunction with audio voice signals is disclosed. The unique initialization protocol allows asynchronous transmission with its short format. The protocol format provides for a hardware preamble for synchronizing a receiver clock, a software preamble for identifying the video image and disabling the audio, automatic gain control adjustment data and amplitude calibration data. The audio portion is disabled by coupling a capacitor across the telephone to effectively short the telephone. The telephone is placed across the bridge circuit which is provided with switches to balance the bridge in both the telephone audio and the video modes. The transmitted as well as the received signals are passed through the same delay equalization circuit, so that half the delay equalization is done before transmission, with the remaining half being done after reception. The use of a multiplexer and demultiplexer allows the same circuit to be used. The digital signals are level shifted from 5 volts to 10 volts prior to being converted into analog, and then are shifted down again to reduce the effects of DC offset. The digital and analog voltage supplies are coupled together with a resistor and diode, and a capacitor is coupled between the analog supply and ground to combine the reset and voltage supply functions. An RC circuit providing 180 degrees of phase shift is coupled to the crystal oscillator to produce a clock which is locked into the series resonant frequency of the oscillator. The camera and the rest of the circuitry are turned on and off by a switch coupled to panel which can be slid in front of the camera, thus providing for the automatic protection of the camera lens when the system is switched off.

U.S. Pat. No. 5,191,601

Inventor: Takashi Ida et al.

Issued: Mar. 2, 1993

A video phone unit comprising a decoder for expanding a received picture transmitted from the other party, a television camera for photographing a subject for producing a photographed picture on one party side, a hook for detecting whether the camera is immobile or mobile and generating either a first detecting signal indicating that the hook is in a mobile state or a second detecting signal indicating that the hook is immobile, a changeover switch for selecting either the received picture expanded at the decoder or the photographed picture taken at the camera after receiving the first or second detecting signal provided from the hook, a display for displaying one picture selected at the changeover switch, and a coder for compressing and transmitting the photographed picture provided from the camera to the other party.

SUMMARY OF THE PRESENT INVENTION

The present invention relates generally to communication devices and, more specifically, to a wireless communication video telephone retained on a wall and including remote control capabilities able to transmit both audio and video signals via satellite and/or cellular communication channels.

A primary object of the present invention is to provide a wireless communication video telephone system that will overcome the shortcomings of prior art devices.

Another object of the present invention is to provide a wireless communication video telephone system which is able to transmit both audio and video signals through a wireless communications channel.

A further object of the present invention is to provide a wireless communication video telephone system which is able to transmit both audio and video signals in a satellite or cellular transmission.

Another object of the present invention is to provide a wireless communication video telephone system which is able to be controlled via a remote control mobile/cordless telephone handset.

An additional object of the present invention is to provide a wireless communication video telephone system including a display screen which may be hung on a wall.

A further object of the present invention is to provide a wireless communication video telephone system which includes a camera which can be manipulated remotely to pan up and down.

A yet further object of the present invention is to provide a wireless communication video telephone system which provides a picturesque image on its display screen when not in use.

A still further object of the present invention is to provide a wireless communication video telephone system including a speaker and microphone for use without the need for a handset.

An even further object of the present invention is to provide a wireless communication video telephone system wherein an image of the calling and receiving party are viewable on the screen.

Another object of the present invention is to provide a wireless communication video telephone system that is simple and easy to use.

A still further object of the present invention is to provide a wireless communication video telephone system that is economical in cost to manufacture.

Additional objects of the present invention will appear as the description proceeds.

A wireless communication video telephone system for establishing a wireless audio/video communication between first and second video telephone units is disclosed by the present invention. The system includes first and second video telephone units and respective first and second wireless communication devices for establishing a wireless communication channel therebetween. Each video telephone units includes a receiver connected to the respective wireless communication device and a display screen for displaying the received video image. A microprocessor is connected to both the receiver and the display unit for receiving the audio and video data signals transmitted over the wireless communications channel. A data storage device is connected to the microprocessor for storing data representative of an image and a digital camera for capturing a digital image and transmitting said captured digital image to the microprocessor. The video telephone is operable in a first not-in-use mode in which the microprocessor reads data from data storage device and displays an image represented by the read data on the display unit and a second in-use mode in which the microprocessor receives the digital data representative of the captured image from the digital camera and the video signal received over the wireless communications channel for display of both on the display unit simultaneously. Each video telephone unit may include a handset for remote wireless operation. The wireless communication device may be one of a satellite dish, a cellular communication unit or any other known device for establishing a wireless communications channel.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views.

DESCRIPTION OF THE REFERENCED NUMERALS

Figure 1:
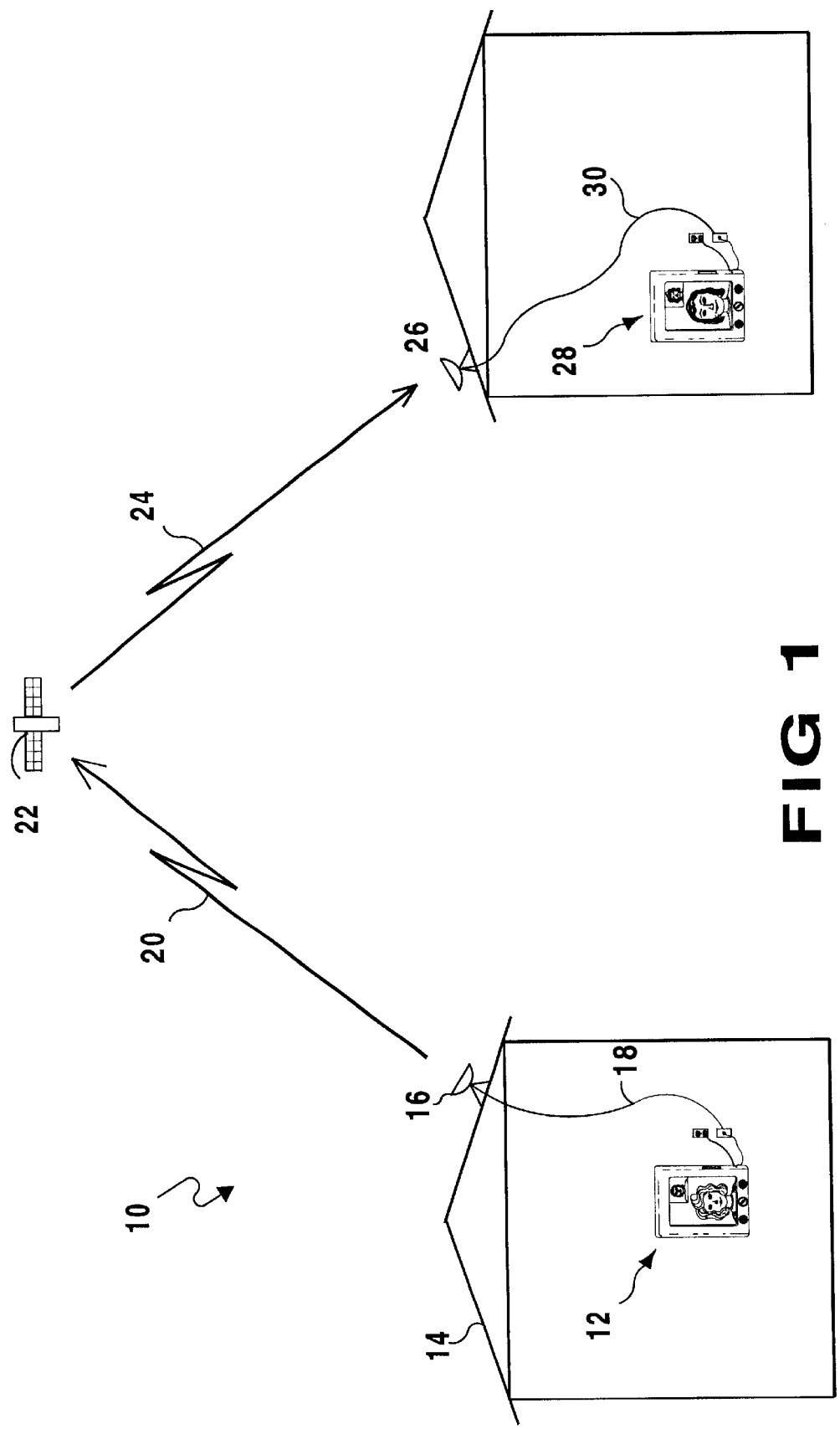
FIG. 1 is a perspective view of the wireless communication video telephone system of the present invention illustrating a satellite communication between two remotely located video telephone units.

Turning now descriptively to the drawings, in which similar reference characters denote similar elements throughout the several views, the Figures illustrate the wireless communication video telephone of the present invention. With regard to the reference numerals used, the following numbering is used throughout the various drawing figures.

10 wireless communication video telephone communication system of the present invention
12 originating video telephone used with the wireless communication
14 building housing originating video telephone unit
16 satellite transmitter/receiver connected to originating video telephone unit
18 wire connecting satellite transmitter/receiver and originating video telephone unit
20 transmission signal transmitted by satellite transmitter/receiver 22 orbiting signal relay satellite
24 relayed transmission signal
26 satellite transmitter/receiver connected to remote video telephone unit
28 remote video telephone unit
30 wire connecting satellite transmitter/receiver and remote video telephone unit
32 wall outlet for wired connection to a satellite transmitter and receiver
34 telephone input jack for connection with satellite
36 speaker
38 microphone
40 camera
42 housing
44 display/monitor showing not-in-use picture
46 disk drive
48 electrical outlet
50 electrical plug
52 display/monitor showing in-use video image of other party
54 display/monitor showing in-use video image captured by camera
56 mobile/cordless telephone handset
58 off key for mobile/cordless telephone handset
60 on/talk key for mobile/cordless telephone handset
62 function/number keys on mobile/cordless telephone handset
64 volume control keys for mobile/cordless telephone handset
66 camera control keys for mobile/cordless telephone handset
68 speaker on mobile/cordless telephone handset
70 microphone on mobile/cordless telephone handset
72 re-dial key on mobile/cordless telephone handset
74 speaker phone key on mobile/cordless telephone handset
76 power recharge port for mobile/cordless telephone handset
77 antenna for communication of handset with video communication telephone
78 audio/video processor
80 ringer on display unit
82 motor for controlling camera motion
84 monitor for display unit
86 volume control for speaker on display unit
88 transmitter for transmitting signals to mobile/cordless telephone handset
90 receiver in mobile/cordless telephone handset
92 ringer in mobile/cordless telephone handset
94 power source in mobile/cordless telephone handset
96 transmitter in mobile/cordless telephone mobile/cordless telephone handset
98 microprocessor in mobile/cordless telephone handset
100 memory in mobile/cordless telephone handset
102 hanging clip
104 receiver in display unit for receiving signals from mobile handset
106 cellular transmitter
108 cellular receiver

DETAILED DESCRIPTION OF THE PREFERRED EMBODIMENT

Turning now descriptively to the drawings, in which similar reference characters denote similar elements throughout the several views, FIGS. 1 through 8 illustrate a wireless communication video telephone system in accordance with the present invention. The wireless video communication system is illustrated in FIG. 1 and is indicated generally by the numeral 10.

The wireless video communication system 10 includes a first originating video communication telephone positioned within a structure 14 for initiating the communication. Initiation of the communication may be by any means such as by dialing a telephone number or through a coded sequence identifying the receiving unit through a satellite communication. The video communication telephone 12 is connected to a satellite transmitter/receiver unit 16 via either a hardwired connection 18 as illustrated in the figure or via a wireless communication path. When the user initiates a call at the originating video communication telephone 12 a signal is relayed to the satellite dish 16 which transmits a signal 20 identifying a destination for the transmission to a communications satellite 22 orbiting the earth. The communications satellite 22 will then relay a signal 24 to a destination satellite dish 26 which receives the signal 24 and transmits the signal 24 to a destination video telephone 28 via a transmission path such as the hard wired connection 30.

The system of the present invention is illustrated as utilizing a satellite dish and satellite communication transmission for purposes of example only. It is to be realized that any known wireless communication channel can be utilized by the system of the present invention and that illustration of such a system is not meant to limit the scope if the present invention.

Figure 2:
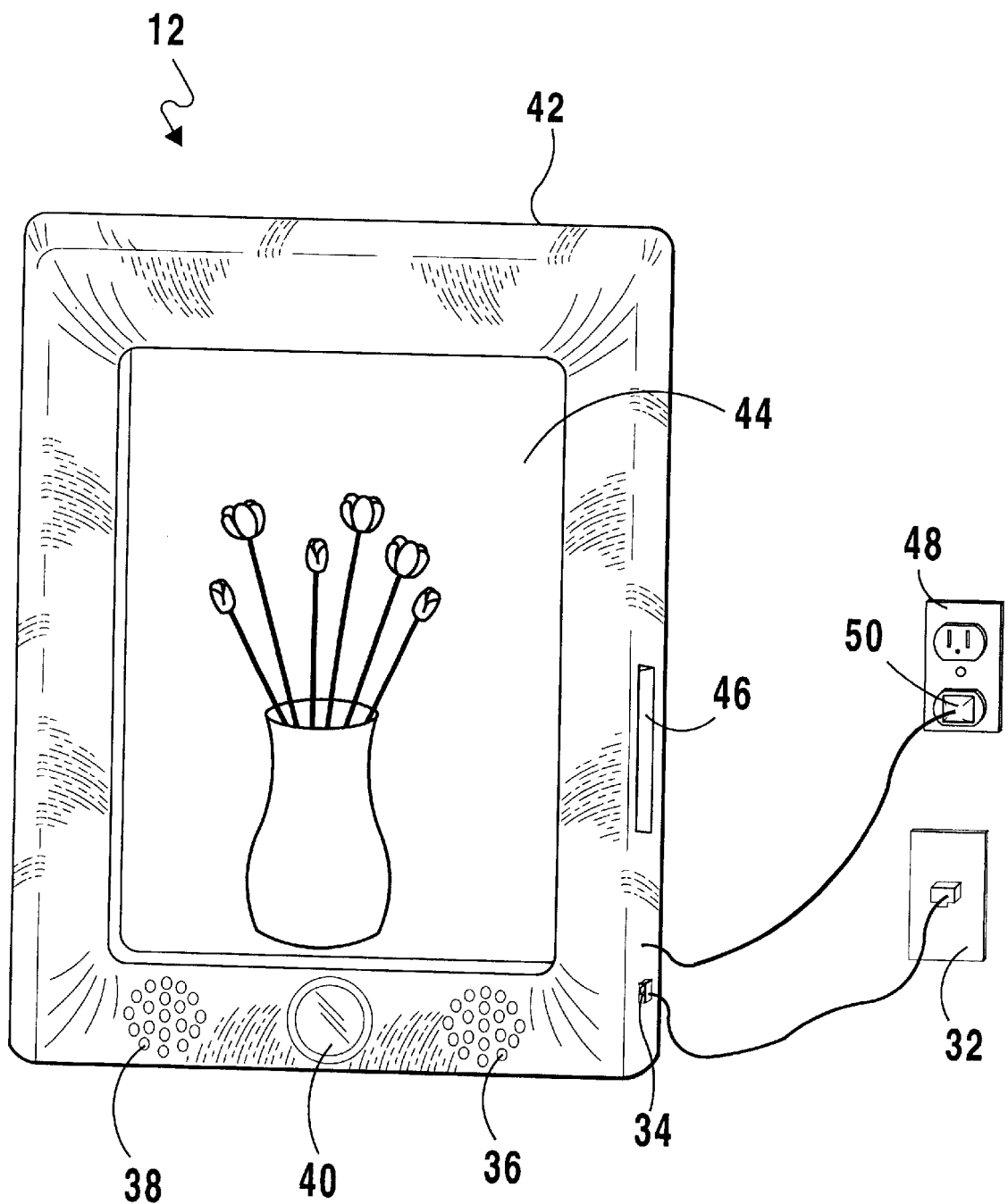
FIG. 2 is a front perspective view of the wireless communication video telephone of the present invention in a not-in-use mode.

The video communication telephone 12 for use with the system of the present invention is illustrated in FIG. 2. The wireless communication video telephone system 10 wirelessly transmits both audio and video signals between remote video communication telephones 12 utilizing one of satellite, cellular or other known wireless communication channels.

Figure 3:
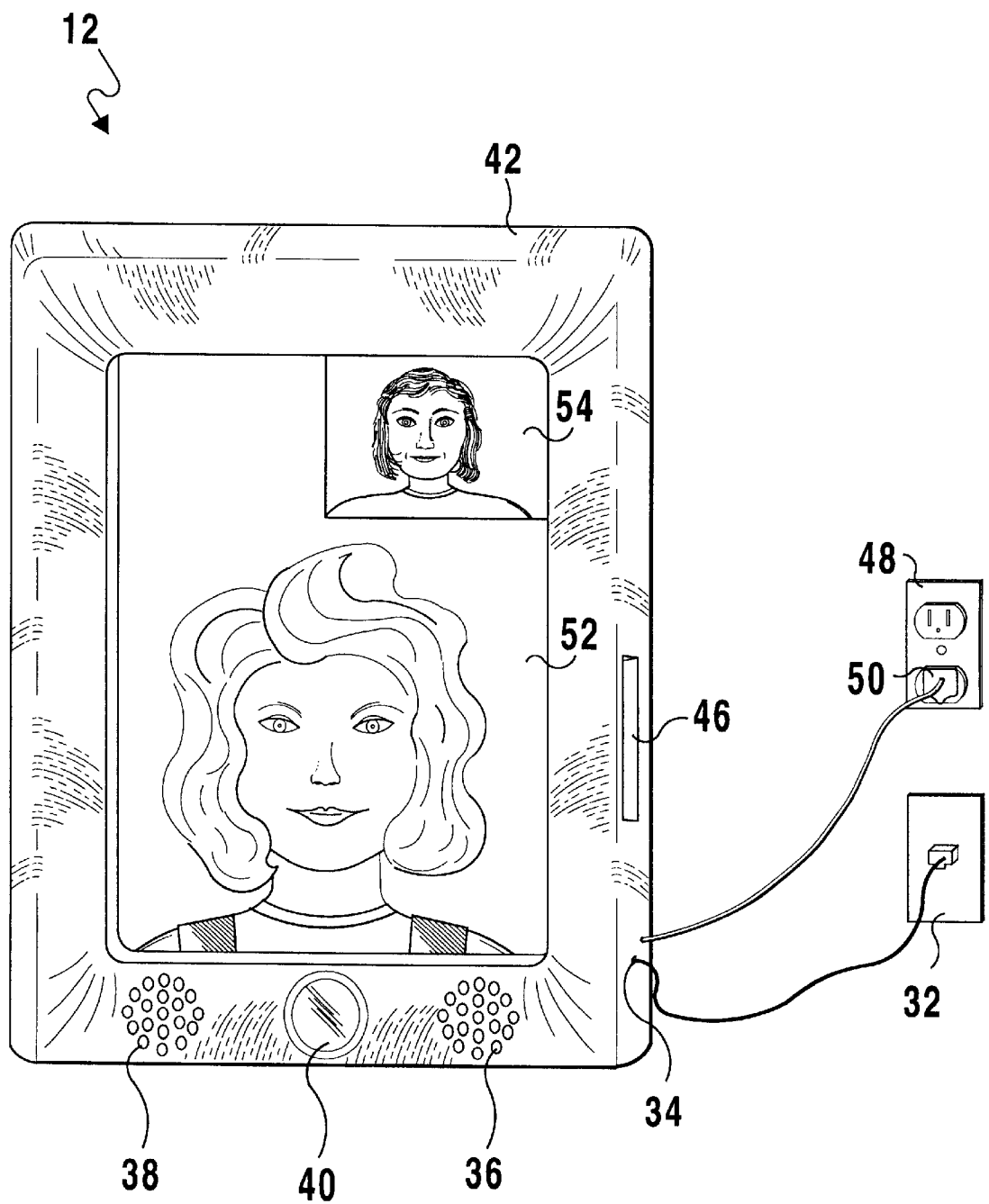
FIG. 3 is a front perspective view of the wireless communication video telephone of the present invention in an in-use mode.
Figure 4:
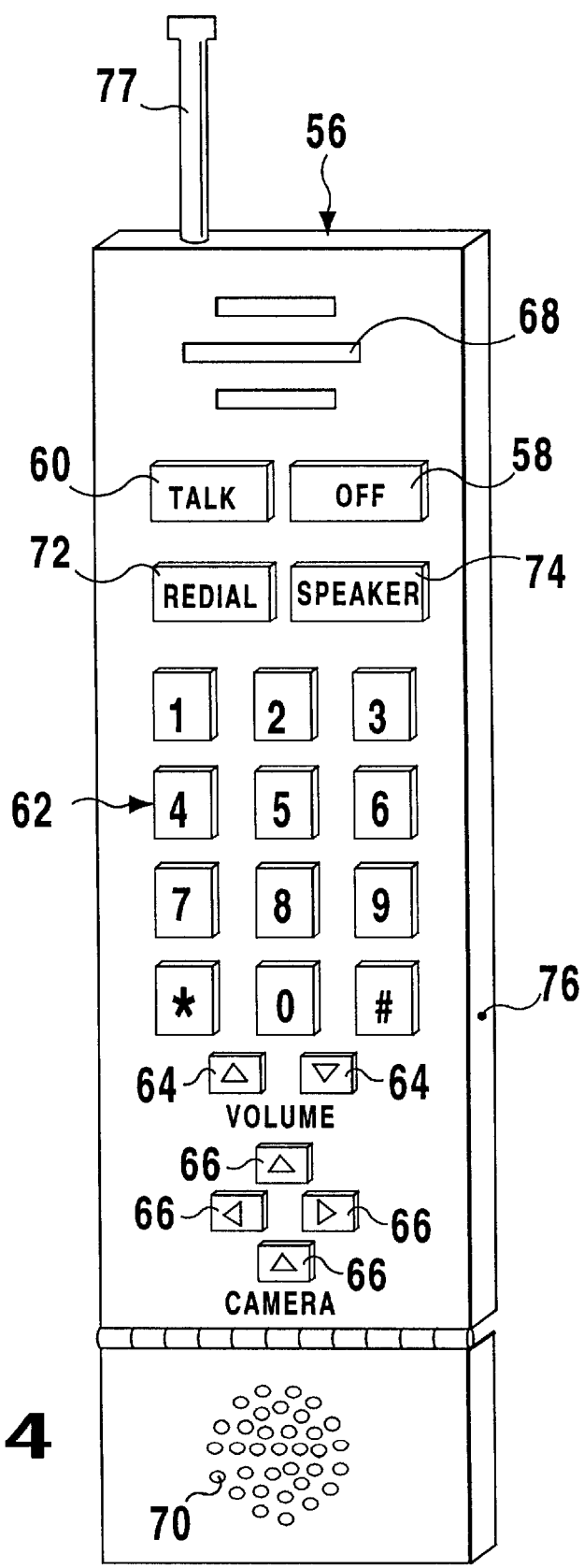
FIG. 4 is a front perspective view of the remote control for the wireless communication video telephone of the present invention.

The video communication telephone 12 used with the system 12 of the present invention includes a video display unit 12 as is illustrated in FIGS. 2 and 3 and a telephone handset 56 as illustrated in FIG. 4. The video communication telephone 12 includes a housing 42, a speaker 36, a microphone 38, a camera 40 and a display screen 44. The display screen 44 displays any desired image stored within a memory within the video communication telephone 12 when in an on hook or not in use mode as will be described hereinafter. Such an image is illustrated in FIG. 2. When a the video communication telephone 12 is in an off hook mode and a communication channel is established with another video communication telephone 12 with video signals being transmitted therebetween, the video communication telephone 12 will display an image captured by the camera 40 on the display 44 and transmitted across the established communications channel as will also be described hereinafter.

The camera 40 is preferably a digital camera which, upon capturing the image, converts the captured image into a digital bit stream for storage or transmission. When in use, the speaker 36 and microphone 38 provide an audio communication channel with the remote video communication telephone 12 at the other end of the communication channel.

The video display unit 42 also includes a disk drive 46 for receiving a diskette including data representative of the image to be displayed during the on hook or not-in-use mode of operation. The video communication telephone 12 includes a microprocessor therein as will be described hereinafter with specific reference to FIG. 6 for reading the diskette and displaying the image represented by the data on the display screen 44 during the on hook period and controlling display of the digital images captured by the cameras 40 on both ends of the communication channel during the off hook or in-use period. The video communication telephone 12 also includes a connection port 34 for connecting via a connection wire to a satellite transmitter/receiver dish or cellular transmitter/receiver as is illustrated in FIG. 1. The connection with the satellite transmitter/receiver dish or cellular transmitter/receiver provides for wireless transmission and reception of the audio and video signals across an established communications channel. An electrical plug 50 for connection to and receiving power from a conventional electrical outlet 48 is also connected to the video communication telephone 12. Alternatively, the video communication telephone 12 may include an internal power source for supplying power thereto. Hooks or other devices for connecting and retaining the video communication telephone 12 in position on a wall are positioned on a back side of the video communication telephone 12 as is illustrated in FIG. 5.

When in-use, the display screen 44 displays both the image of the party captured by a camera 40 of the remote video communication telephone 12 on the opposite end of the established communication channel 52 and an image 54 captured by the camera 40 of the locally situated video communication telephone 12 as is illustrated in FIG. 3. Thus, a party using the wireless communication video telephone system 10 can view both the party to which they are communicating and themselves during a transmission.

The mobile/cordless handset 56 for remotely controlling the operation of the video communication telephone 12 is illustrated in FIG. 4. The mobile/cordless handset 56 includes an off switch 58 for terminating a connection and a talk switch 60 for initiating a connection, e.g. picking up the telephone to receive an incoming call or turning the telephone on to initiate an outgoing call. A numerical keypad 62 for dialing a telephone number to initiate a conversation with another party is also present on a face of the mobile/cordless handset 56. The mobile/cordless handset 56 also includes volume control keys 64 and camera control keys 66. The volume control keys 64 control the volume level of the speaker 36 on the video communication telephone 12 and the camera control keys 66 control movement of the camera 40 in the video communication telephone 12. A speaker 68 and microphone 70 are also present for communication through the handset 56 along with a redial key 72 and speakerphone key 74 as in a conventional telephone handset. The redial key 72 redials the last telephone number dialed and the speakerphone key 74 provides for speakerphone communication through the speaker 36 and microphone 38 on the video communication telephone 12. Transmission of these signals from all of the keys on the mobile/cordless handset 56 is via a transmitter and antenna 77 positioned within the mobile/cordless handset 56. The antenna is also able to receive audio signals from the video communication telephone 12 thereby allowing the user to communicate orally through the handset 56. The illustration of the control keys on the handset 56 are for illustration purposes only. The handset may include all or any combination of keys as described above.

Figure 5:
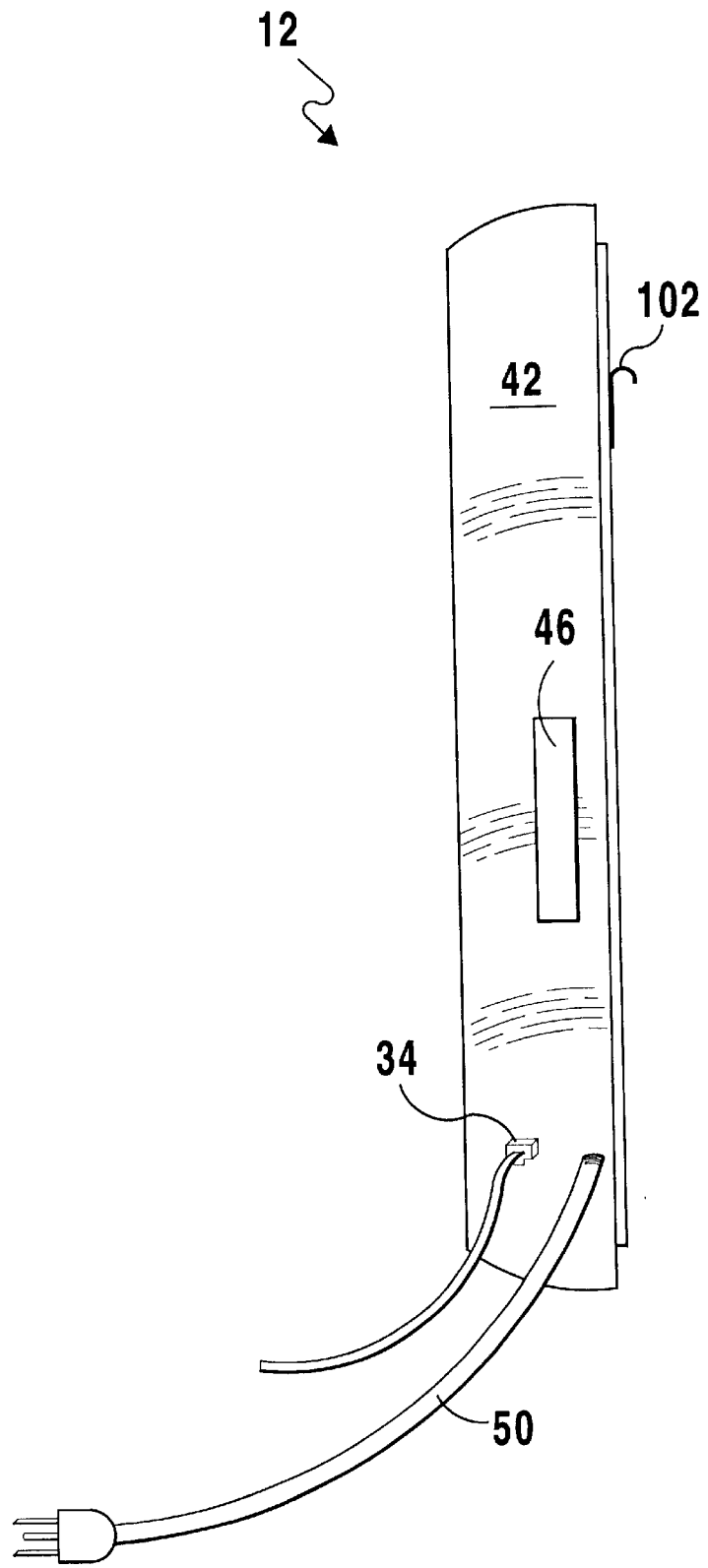
FIG. 5 is a side view of the video display unit of the wireless communication video telephone of the present invention.

A side view of the video communication telephone 12 is shown in FIG. 5. From this view the connection 34 to the satellite dish and the external power source connection 50 are clearly seen. The disk drive 46 for insertion of a diskette is also clearly seen. Operation of the disk drive 46 with reference to the video communication telephone 12 will be described in more detail hereinafter. Also seen in this figure is a clip 102 for hanging the video communication telephone 12 on a wall. It is to be realized that the clip 102 is used for purposes of example only and that any means for hanging and retaining the video communication telephone 12 on a wall may be used.

Figure 6:
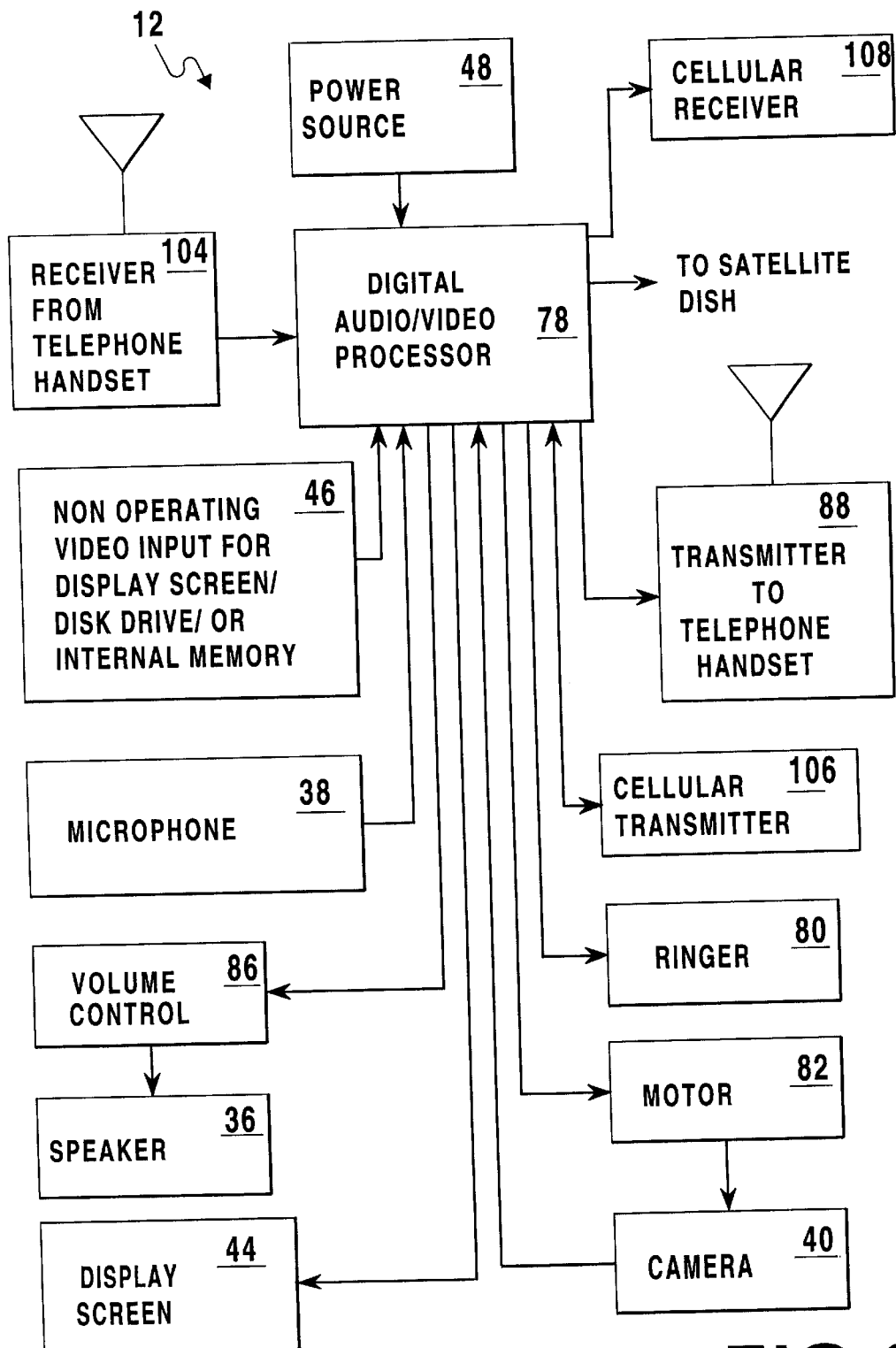
FIG. 6 is a block diagram illustrating the internal components of the video display unit of the wireless communication video telephone of the present invention.

FIG. 6 illustrates the internal components of the video communication telephone 12 of the present invention. The video communication telephone 12 includes a digital audio/video processor 78 which is connected to the display screen 44 for delivering an image for display thereon. The digital audio/video processor 78 is connected to receive audio and video data signals via the connection to the satellite dish or the cellular receiver 108. The audio and video signals received via the wireless communication channel are representative of the audio signals and video signals representative of the image captured by the digital camera at the other end of the communication channel respectively and transmitted via the wireless communication channel. The microprocessor also receives audio and data signals from the telephone handset 56 via a receiver 104.

The digital audio/video processor 78 is also connected to the disk drive/video input device 46 for receiving data therefrom for displaying a desired image on the video display screen 44 when the video communication telephone 12 is in an on hook mode. The image delivered to the display screen 44 is produced from data received from one of a diskette inserted in the video input device 46 or stored within an internal memory within the digital audio/video processor 78. The digital audio/video processor 78 receives audio data from the microphone 38 and digital data representative of the image captured by the digital camera 40 for transmission over the wireless communication channel to a party at the other end of a communication and also processes the digital data for display on the display screen 44. When an incoming call is received by the digital audio/video processor 78 via the cellular receiver 108 or satellite dish connection, a signal is delivered to the ringer 80 thereby informing the party at the receiving end of the communication that a telephone call is incoming. Power is received by the video communication telephone 12 and the digital audio/video processor 78 via a connection to an external power source 48. Alternatively, the power source 48 may also be connected within the video communication telephone 12 to provide power as needed.

A transmitter 88 within the display unit 26 and connected to the digital audio/video processor 78 transmits audio signals and the received ringer signals to the remote/cordless handset 56 so a user may communicate directly through the remote/cordless handset 56. A receiver 104 receives control signals from the remote/cordless handset 56 for controlling a motor 82 connected to move the camera 40 in any direction to capture a different image. The video communication telephone 12 acts a base unit in a conventional cordless telephone receiving dialing and speaker phone signals from the handset 56 for establishing a connection with the satellite dish and initiating activation of the speaker 36 for audibilizing an audio signal representative of the audio signal transmitted by the party at the other end of the communication. The volume at which the speaker 36 is set is variable and may be controlled by a signal received from the remote/cordless handset 56.

Figure 7:
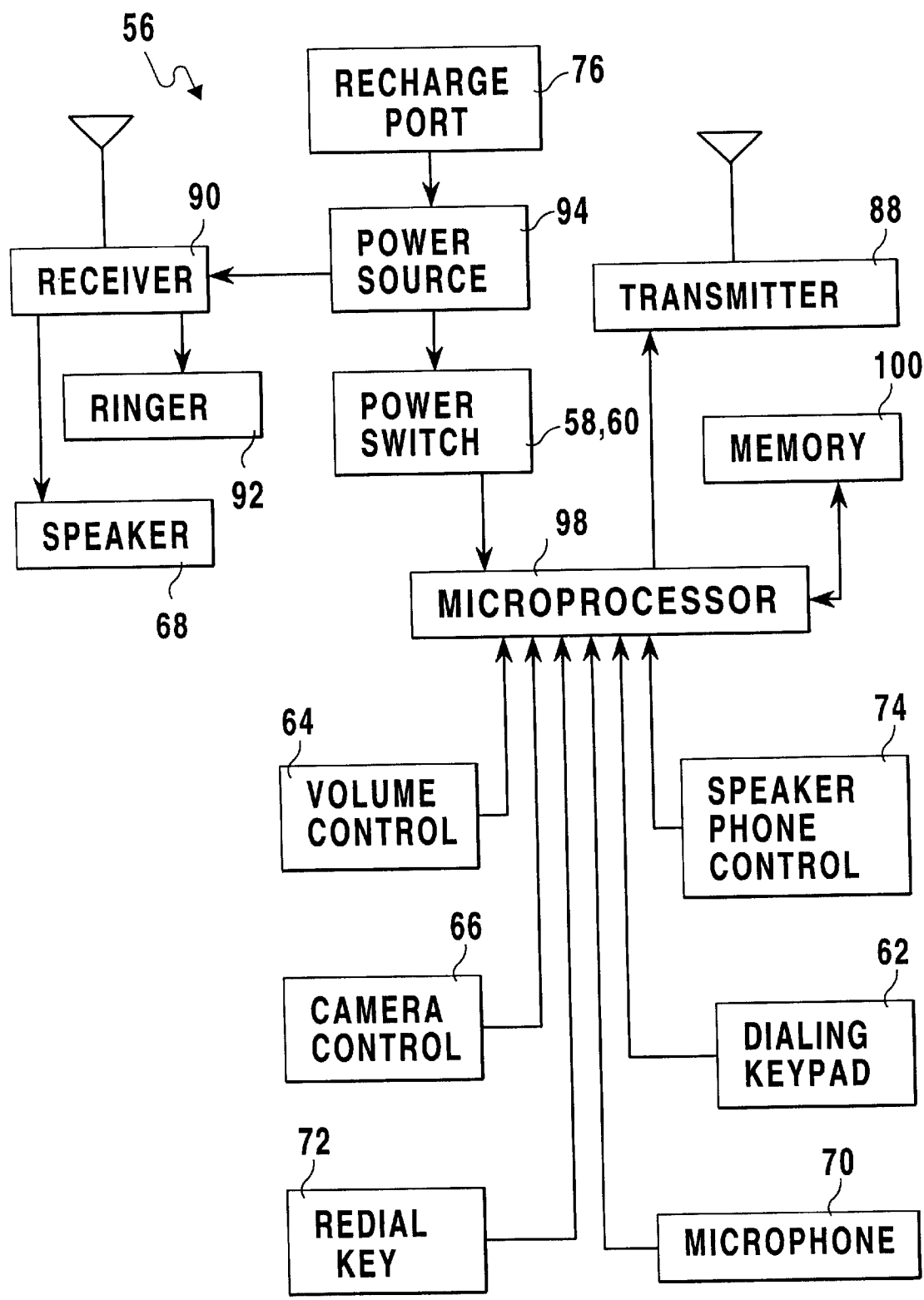
FIG. 7 is a block diagram illustrating the internal components of the mobile/cordless handset used with the wireless communication video telephone of the present invention.

The internal components of the remote/cordless handset 56 are illustrated in FIG. 7. The remote/cordless handset 56 includes a microprocessor 98. The microprocessor 98 is connected to an internal power source 94 via the off and talk switches 58, 60. The microprocessor 98 is also connected to receive control signals from the dialing keypad 62, the volume control keys 64, the camera control keys 66, the microphone 70, the redial button 72 and the speaker phone control 74 for transmission of the received control signals to the video communication telephone 12 when the talk key 58 is activated. The speaker phone control key 74 will transmit a signal to the microprocessor 98 indicative of a desire to activate or deactivate the speaker 36 on the video communication telephone 12 and the volume control keys 64 will transmit a signal indicating a desire to increase or decrease the volume of the speaker 36 when the speaker 36 is activated by the speaker phone control key 74. The dialing keypad 62 will transmit a signal indicative of a desired telephone number to call to the transmitter 88 for relay to the video communication telephone 12 and ultimate transmission through a wireless communication channel. The telephone numbers input through the dialing keypad 62 are stored in a memory unit 100 by the microprocessor 98 for use when activating the redial key 72, thus the last dialed telephone number need not be fully re-input using the dialing keypad 62 but automatically redialed by pressing the redial key 72. Audio signals are also input to the microprocessor 98 via the microphone 70 for transmission to the video communication telephone 12 and over the wireless communications channel to the party with which the telephone communication is being held.

The handset 56 also includes a receiver 90 connected to a speaker 68 and ringer 92 for receipt of audio signals and telephone ringing signals from the video communication telephone 12 as in a conventional cordless telephone. The receiver 90 is connected to receive power from the internal power source 94 at all times and thereby can receive a call ring signal from the video communication telephone 12 at any time a call is received by the video communication telephone 12. The power source 94 is preferably rechargeable and can be recharged by an external power source via the recharge port 76.

It is to be understood that this video telephone will operate either solely, i.e. only one of the parties to the communication has video telephone capabilities, or if both or all of the parties to the communication is using a telephone with video capabilities. If all of the parties do not have video telephone capabilities, the video telephone will operate as a conventional audio telephone. As in all conventional audio telephones, this device is able to accommodate all service provided by the telephone company including caller ID, call waiting, conference calling, voice mail, etc.

The operation of the device and system will now be described. It is to be understood that the operation of the present invention is similar to that of a conventional cordless phone but includes video capabilities and is able to display an image on the display screen when a communication channel is not open.

In operation, the video display unit is securely positioned on a wall and is connected to an electrical outlet or other power source and also to the conventional telephone line. An internal power source is placed within the remote/cordless handset to place it in an operational mode and the video telephone is prepared for use. When no communication channel is in use, a diskette is placed within the disk drive and data representative of a video image and stored thereon is read by the digital microprocessor for display on the display screen. If such data is stored on an internal memory, the data stored therein may be read for display on the display screen.

When the user wishes to place an outgoing call, the talk key on the remote/cordless handset is pressed to activate the video telephone and receive a dial tone. At this time the digital camera is also activated to begin capturing an image in its view. The user then dials a telephone number on the numerical keypad which is transmitted to the video display unit and a telephone call is initiated. The initiating video communication telephone 12 will transmit a signal to the satellite dish connected thereto, via a cellular transmitter or via any other known wireless communication means to the desired destination party. This signal will be received by the video communication telephone 12 at the destination causing the video communication telephone 12 at the destination to indicate an incoming communication signal is being received. When the party at the destination answers the video communication telephone at the other end of the communication a connection is established. At this time both audio signals and digital data signals representative of the image captured by the digital camera are processed in the microprocessor and transmitted over the telephone line between the communicating parties. The digital signal from the camera at each end of the communication displays the image on the display screen along with the image represented by the digital data signal transmitted by the telephone at the other end of the communication.

The user may move the camera to change its line of sight by pressing the control keys on the remote/cordless handset. When these keys are pressed, a control signal is transmitted to the display unit and based on the control signals the microprocessor controls a motor to move the camera as desired. The volume of the speaker on the display unit may be controlled by pressing the volume keys on the remote/cordless handset. In this instance, a volume control signal is transmitted to the display unit and based upon these signals the volume of the speaker is controlled in a conventional manner. When it is desired to end the communication, the off key on the remote/cordless handset is pressed and the communication is terminated thereby freeing up the communication channel for another transmission. The camera is turned off and the microprocessor once again reads the data stored in either the internal memory or on a diskette inserted in the disk drive to display an image on the display unit.

When a telephone call is placed to the video telephone, a signal is received through the wireless communication channel connection and the microprocessor causes the ringer in the video communication telephone to ring and transmits a signal to the remote/cordless handset causing the ringer therein to produce a sound indicative of an incoming call. When the talk key on the remote/cordless handset is pressed a call is initiated and the camera is turned on and the call proceeds as described above.

From the above description it can be seen that the wireless communication video telephone system of the present invention is able to overcome the shortcomings of prior art devices by providing a wireless communication video telephone system including video telephone units able to transmit both audio and video signals therebetween via a wireless communication channel. The video telephone units are able to be controlled via remote control and may be hung on a wall. The video telephone units of the wireless communication video telephone system also include a camera which can be manipulated via remote control to pan up and down, provides a picturesque image on its screen when not in use and is able to provide an image of both the calling and receiving party on the screen concurrently. The video telephone units of the wireless communication video telephone system also include a speaker and microphone for use without the need for a handset. Furthermore, the wireless communication video telephone system of the present invention is simple and easy to use and economical in cost to manufacture.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A wireless communication video telephone system for establishing a wireless audio/video communication between first and second video telephone units, said system comprising:
   a) first and second video telephone units, each video telephone unit including a wireless handset;
   b) first and second wireless transmission means, each connected to a respective one of said first and second video telephone units for establishing a wireless communication channel therebetween, wherein each of said video telephone units includes:
      i) first receiver means for receiving wirelessly transmitted audio and video signals received by said respective wireless transmission means;
      ii) second receiver means for receiving signals from said handset;
      iii) a flat display screen, surrounded by a frame containing a telephone base unit, for displaying said video image;
      iv) a microprocessor connected to both said first and second receiver means and said display screen for receiving the audio and video data signals transmitted over the wireless communications channel;
      v) data storage means in said frame connected to said microprocessor for storing data representative of an image; and
      vi) a digital camera mounted in said frame for capturing a digital image and transmitting said captured digital image to said microprocessor, wherein said video telephone is operable in a first not-in-use mode in which said microprocessor reads said data from said data storage means and displays said image represented by said data on said display screen and a second in-use mode in which said microprocessor receives said digital data representative of said captured image from said digital camera and said video signal received over the wireless communications channel for display of at least one of said digital data representative of said captured image from said digital camera and said video signal received from said wireless communication means on said display screen; and
   c) each handset including:
      i) a switch for generating a control signal for switching said respective video telephone unit between said first and second modes;
      ii) a transmitter for transmitting said control signal to said respective video telephone unit;
      iii) a dialing keypad connected to said transmitter for generating a control signal indicative of a desired communication channel to open for transmission to said respective video telephone unit when said video telephone unit is in said second mode; and
      iv) camera control keys connected to said transmitter for generating and sending a camera control signal for moving said camera horizontally and vertically adjacent said display screen to change the line of sight of said camera.

2. The system as recited in claim 1, wherein said wireless communication means is a satellite dish connected to said respective video telephone unit and including means for receiving both audio and video signals and means for transmitting audio and video signals received from said respective video telephone unit.

3. The system as recited in claim 1, wherein said wireless communication means is a cellular communication unit connected to said respective video telephone unit and including means for receiving both audio and video signals and means for wirelessly transmitting audio and video signals received from said respective video telephone unit.

4. The system as recited in claim 1, wherein each of said video telephone unit further includes a speaker for audibilizing audio signals received from said wireless communication means.

5. The system as recited in claim 4, wherein each of said video telephone units further includes a microphone for capturing audio signals for transmission to said wireless communication means and thereby over a wireless communication channel established thereby.

6. The system as recited in claim 5, wherein said handset includes a speaker control key connected to said transmitter for generating a speaker control signal to activate said speaker and microphone on said respective video telephone unit.

7. The system as recited in claim 1, wherein said data storage means is an internal memory having data representative of an image stored therein, said data being read by said microprocessor for display on said display screen when said video telephone unit is in said first mode.

8. The system as recited in claim 1, wherein said data storage means is a disk drive for receiving a data diskette having data representative of an image stored thereon, said data stored on said data diskette being read by said microprocessor for display on said display screen when said video telephone unit is in said first mode.

9. The system as recited in claim 1, wherein each of said video telephone units further includes a transmitter connected to said microprocessor for transmission of the audio signals received from the wireless communication means and said handset further includes a receiver and a speaker for receiving and audibilizing said audio signals received by said video telephone unit.

10. The system as recited in claim 9, wherein said handset further includes a microphone connected to said transmitter for collecting audio signals from an area surrounding said microphone and generating a signal representative of said collected signals audio signal for transmission to said video telephone unit for transmission by said wireless communication means.

11. The video telephone as recited in claim 1, wherein said handset further includes a rechargeable internal power source and a recharge port connected to said internal power source for connection of an external power source for use in recharging said internal power source.

* * * * *